US009817671B2

(12) United States Patent
Harrington

(10) Patent No.: US 9,817,671 B2
(45) Date of Patent: Nov. 14, 2017

(54) RULE-BASED ACTIVATION OF BEHAVIORS IN AN EXTENSIBLE SOFTWARE APPLICATION

(71) Applicant: MICROSOFT CORPORATION, Redmond, WA (US)

(72) Inventor: Paul Harrington, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 65 days.

(21) Appl. No.: 14/319,125

(22) Filed: Jun. 30, 2014

(65) Prior Publication Data

US 2015/0378742 A1    Dec. 31, 2015

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/445 | (2006.01) |
| G06F 9/54 | (2006.01) |
| G06F 9/455 | (2006.01) |

(52) U.S. Cl.
CPC ............ *G06F 9/44* (2013.01); *G06F 9/44505* (2013.01); *G06F 9/44526* (2013.01); *G06F 9/542* (2013.01); *G06F 9/45508* (2013.01)

(58) Field of Classification Search
None
See application file for complete search history.

(56) References Cited

U.S. PATENT DOCUMENTS

| | | | |
|---|---|---|---|
| 7,559,034 B1 * | 7/2009 | Paperny et al. | 715/803 |
| 7,676,804 B2 | 3/2010 | Ferguson et al. | |
| 7,908,580 B2 | 3/2011 | Stubbs et al. | |
| 8,516,507 B2 | 8/2013 | Horvitz et al. | |
| 2003/0009447 A1 * | 1/2003 | Murray et al. | 707/3 |
| 2003/0229900 A1 * | 12/2003 | Reisman | G06F 17/30873 725/87 |
| 2006/0026591 A1 * | 2/2006 | Backhouse et al. | 717/177 |
| 2009/0193444 A1 | 7/2009 | Clark et al. | |
| 2009/0307652 A1 | 12/2009 | Maybee et al. | |
| 2010/0235821 A1 | 9/2010 | Baldwin et al. | |
| 2013/0055237 A1 * | 2/2013 | Fei et al. | 717/178 |
| 2013/0151942 A1 | 6/2013 | Ouliankine et al. | |
| 2013/0198623 A1 | 8/2013 | Claux et al. | |

(Continued)

OTHER PUBLICATIONS

Denver, Allen, "How to Get a VS Package to Load", May 4, 2006, Retrieved from: http://blogs.msdn.conn/b/allend/archive/2006/05/04/590055.aspx, pp. 2.

(Continued)

*Primary Examiner* — Craig Dorais

(57) ABSTRACT

An extensible software application utilizes rules to initiate a behavior that performs operations that customize the extensible software application in a preferred manner. The behavior is applied when pre-defined events occur during execution of the extensible software application. The rules are provided by a third party developer in metadata that is separate from the extension's program code. The rules are based on expressions that define the events that need to take place during the execution of the extensible software application before the behavior is applied.

20 Claims, 6 Drawing Sheets

(56) References Cited

U.S. PATENT DOCUMENTS

2013/0198627 A1    8/2013  Claux et al.
2013/0263096 A1*  10/2013  Hulick .......................... 717/130
2014/0281577 A1*   9/2014  Nicholes ....................... 713/189

OTHER PUBLICATIONS

"International Search Report and Written Opinion Issued in PCT Application No. PCT/US2015/038223", dated Oct. 7, 2015, 15 Pages.

Desrivieres, et al., "Eclipse Platform for Integrating Devepment Tools", In IBM Systems Journal, vol. 43, Issue 2, Jan. 1, 2004, pp. 371-383.

Robbins, J., "Extending the Visual Studio. NET IDE", Retrieved at <<http://web.archive.org/web/20070513002949/http://msdn.microsoft.com/msdnmag/issues/02/01/bugslayer/print.asp>>, Jan. 2002, 6 Pages.

Spjuth, Ola, "Writing Your First Plugin for Bioclipse—A Short Tutorial", Retrieved at <<https://web.archive.org/web/20071213080711/http://www.bioclipse.net/dl/firstPlugin_Bioclipse.pdf>>, Dec. 13, 2007, 11 Pages.

Wilke, et al., "Event-Driven Verification in Dynamic Component Models", In Proceedings of the Fifteenth International Workshop on Component-Oriented Programming, Jun. 22, 2010, pp. 79-86.

"Second Written Opinion Issued in PCT Application No. PCT/US2015/038223", dated May 25, 2016, 8 Pages.

"International Preliminary Report on Patentability Issued in PCT Application No. PCT/US2015/038223", dated Sep. 15, 2016, 9 Pages.

\* cited by examiner

Metadata 202

Activation Context 204 — [$RootKey$\ContextRules\{622a8a4d-e1ad-4dff-bed9-944b510c8f6a}]
Rule 206 — "Expression" = "DotConfig"
Term 208 — "DotConfig" = "HierSingleSelectionName:\.config$"

*FIG. 2A*

Metadata 210

Activation Context 212 — [$RootKey$\ContextRules\{E45C6862-F7ED-4F16-8736-3B001FAE5054}]
Rule 214 — "Expression" = "! Debugging & (XmlFile | Html File)"
Term 216 — "Debugging" = "{A6E5769D-6119-4CDD-A144-98C72A5E56D1}"
Term 218 — "XmlFile" = "EditorContent:XML"
Term 220 — "HtmlFile" = "EditorContent:HTML"

*FIG. 2B*

Metadata 230

| | |
|---|---|
| Activation Context 232 | [$RootKey$\ContextRules\{84418D17-5D9A-4BC8-B378-E54C1B80E6C2}] |
| Rule 234 | "Expression" = "SolutionExists" |
| Term 236 | "SolutionExists" = "{741B88D0-20D0-40F8-84D4-27E70425B390}" |
| Delay 238 | "Delay" = 1000 |

*FIG. 2C*

RULE-BASED ACTIVATION OF BEHAVIORS IN AN EXTENSIBLE SOFTWARE APPLICATION

BACKGROUND

Extensible software applications support the use of extensions (e.g., add-in, snap-in, theme, skin, plug-in) to extend the capabilities of the software application. An extension provides a software application with additional features and functions that are not present in the software application. Additionally, an extension may provide the author of the extension (e.g., third party developer) with the ability to define customizations tailored to the preference of the extension's author. For example, an extension may be used to add or change the appearance of a graphical user interface to include icons, buttons, menus, colors, and other graphical elements preferred by the extension's author.

Extensions are beneficial for software applications where the cost of maintaining and upgrading the software application is costly. Most extensions are typically provided by a third party other than the author of the software application. By allowing developers to incorporate their extensions into a software application, the life of the software application may be extended in an economical manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An extensible software application utilizes rules to activate or deactivate a behavior. A behavior is an operation that is applied to the extensible software application, such as automatically loading or unloading an extension. The rules are based on expressions that specify events that need to occur before the behavior is applied. The expressions enable an extension author to specify different combinations of events to initiate a behavior. The events occur during the runtime execution of the extensible software application.

The rules utilize an activation context that indicates whether to activate or deactivate the behavior. The outcome of the evaluation of a rule sets the state of the activation context. A notification is made whenever there is a change in the state of the activation context in order to facilitate application of the behavior.

The rules are incorporated into metadata that is separate from the extension's program code. In this manner, the extensible software application does not need to read the program code in order to determine when to apply the behavior. The expression-based rules allow the extension's author to specify combinations of events that need to occur in order for the behavior to be applied. In this manner, a finer granularity of detail can be specified by the extension's author to control when to activate or deactivate application of the behavior.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 2A-2C illustrate exemplary rules used to activate or deactivate an activation context.

DETAILED DESCRIPTION

Figure 1:
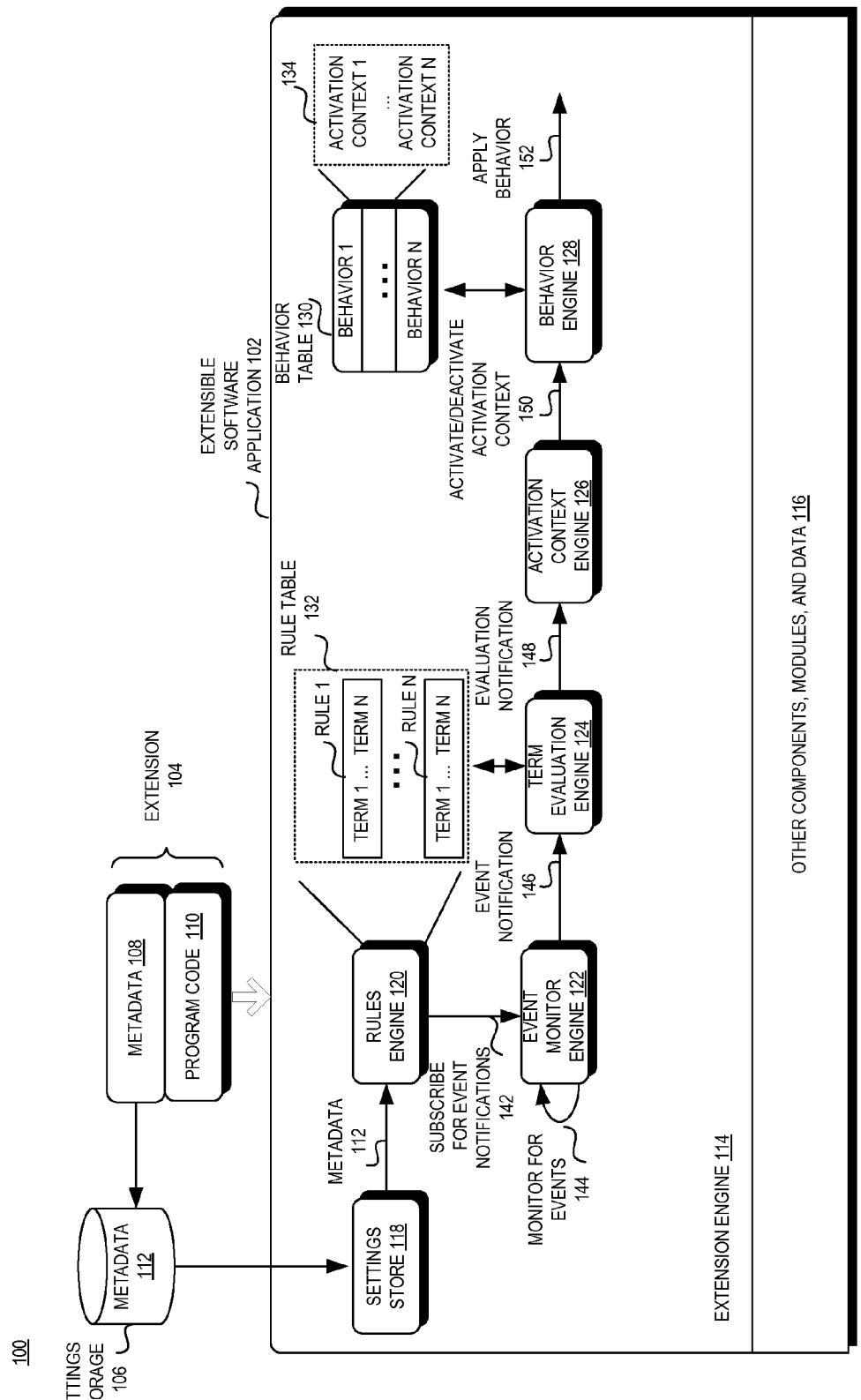
FIG. 1 illustrates an exemplary system for initiating a behavior in an extensible software application based on pre-defined rules.

An extensible software application utilizes rules to initiate a behavior that performs operations that customize the extensible software application in a preferred manner. The behavior is applied when pre-defined events occur during execution of the extensible software application. The rules are provided by a third party developer (i.e., the author of the extension, "extension author") and define the events that need to take place during execution of the extensible software application before the behavior is applied. A behavior performs an operation during execution of the extensible application, such as automatically loading or unloading the extension when the pre-defined events, defined by the extension author, occur. For example, the extension author may use a rule to initiate a behavior that indicates whether a certain tool bar, menu, icon, button, color is to be displayed or hidden in a graphical user interface. Additionally, the extension author may use another rule to initiate a behavior that displays a window tool box when certain conditions are met, or hides it when those conditions are no longer met.

An extensible software application is a software application that supports the use of extensions. An extension may be formed and transmitted as a package having a separate file containing metadata and one or more files containing the extension's program code. The metadata file contains rules and is contained in a file separate from the extension's program code. The extensible software application reads the rules from the metadata file without loading or executing the extension's program code. As such, the extensible software application is able to read the rules from the metadata file quickly without significantly impacting the performance of the extensible software application.

A rule is tied to an activation context. The rule sets the state of the activation context to either 'activate' or 'deactivate.' An activation context is a flag that is managed by the extensible software application. An activation context is identified by a symbolic name, such as a global unique identifier (GUID). At any time during the execution of the extensible software application, the state of an activation context may be set to either activate or deactivate.

An extensible software application may include an activation context engine to manage the activation contexts. The activation context engine may provide a mechanism whereby extensions may be notified of changes to the state of the activation context. The activation context is used to signal that the rule has been evaluated to either activate or deactivate the behavior associated with the activation context.

A rule specifies conditions or events that need to occur before an activation context is activated or deactivated. The rule is formulated as a Boolean expression that when evaluated produces a true or false result or value. The Boolean expression is composed of terms. A term identifies an event that needs to occur during execution of the software application in order for the rule to be evaluated. When any of the events specified by a term occurs, the Boolean expression is re-evaluated. If the result of the re-evaluation changes from false to true, then the rule activates the activation context. If the result of the re-evaluation changes from true to false, then the rule de-activates the activation context. If the result of the re-evaluation does not change, then no further action is taken by the rule.

The rules provide an extension author with more flexibility in specifying the events for performing a behavior. An expression supports various different combinations of events which may be too numerous and impractical to predefine in the extensible software application.

Attention now turns to a discussion of the infrastructure supporting a rule-based mechanism to control the behavior of an extensible software application. Turning to FIG. 1, there is shown a block diagram including exemplary components of a system 100 that activates a behavior of an extensible software application utilizing pre-defined rules. The system 100 includes an extensible software application 102, an extension 104, and a settings storage 106.

The extensible software application 102 may be any type of computer program that supports the use of extensions. The extensible software application may be an integrated development environment (IDE) (e.g., Visual Studio), a developer tool, an image editing software (e.g. Abode Photoshop), an email application, a cloud service, a web browser, etc. The extensible software application 102 may be implemented using any suitable high-level, low-level, object-oriented, visual, compiled and/or interpreted programming language.

The extension 104 includes metadata 108 and program code 110. The extension 104 may be formatted as a package with multiple files. The metadata 108 is included in a separate file from the program code 110. The metadata 108 may be stored in an external storage device, such as setting storage 106.

The extensible software application 102 may include an extension engine 114 as well as other components, modules and data 116. The extension engine 114 may include a settings store 118, a rules engine 120, a rule table 132, an event monitor engine 122, a term evaluation engine 124, an activation context engine 126, a behavior engine 128, and a behavior table 130. The rules engine 120, event monitor engine 122, term evaluation engine 124, activation context engine 126, behavior engine 128, and the behaviors are processor-executable components including instructions that may be implemented according to a predefined computer language, manner or syntax, for instructing a processor to perform a certain function. The instructions may be implemented using any suitable high-level, low-level, object-oriented, visual, compiled and/or interpreted programming language.

The settings store 118 contains the metadata 112 from the settings storage 106. The rules engine 120 builds the rules and terms from the metadata 112. The rules and terms may be stored locally in a rule table 132. Each rule is formulated as a Boolean expression consisting of Boolean variables joined by Boolean operations that when evaluated assumes a value of either a true or false. A Boolean variable takes on the value of either true or false. Each rule is composed of one or more terms, where each term assumes a value of either true or false. Each term specifies an event that has to occur in order for the term to evaluate to a value of true. When the condition or event does not occur, the term assumes a value of false. The event may be constructed as a regular expression that describes a sequence of characters in a particular pattern that when matched evaluates the associated term with a true value. The rule may optionally specify a delay. The delay indicates that any activations or de-activations of the rule's activation context should be postponed by the given time interval.

The rules engine 120 subscribes to the event monitor engine 122 for notifications of the events 142 associated with each term. The event monitor engine 122 receives these notifications and monitors the actions of the extensible software application for the occurrence of these events 144. The term evaluation engine 124 receives the notifications of these events 146 and evaluates each term in accordance with the term's corresponding regular expression 132. When the conditions set forth in the rule are satisfied, and the optional delay time has elapsed, the term evaluation engine 124 notifies the activation context engine 126 of the rule's evaluation 148 and the activation context engine 126 sets the corresponding activation context accordingly.

Initially, the behavior engine 128 reads the metadata file and associates each activation context with its corresponding behavior in the behavior table 130. When the behavior engine 128 is notified of the setting of the activation context 150, the behavior engine 128 searches the behavior table 130 for the behavior that corresponds to the activation context. A behavior is a software component that performs a predetermined operation. Each behavior may be associated with one or more activation contexts (e.g., activation context 1 . . . activation context N 134). The behavior 130 corresponding to the engaged activation context is then applied 152.

Attention now turns to a further discussion of the metadata. The following description is based on the extensible software application being an integrated development environment, such as Visual Studio, executing within a Windows-based operating system. In this scenario, the extension registers with the registry. The registry is a central repository for storing configuration data and settings used by the Windows-based operating system. The registry is configured as a hierarchical folder-like structure of files where each subset of files is referred to as a registry hive. Each registry hive is associated with a registry key which is similar to a folder in a file system. In the following examples, the activation context is associated with a registry key that identifies the associated extensible software application. The registry also uses a global unique identifier (GUID) to identify flags that reside in the registry. The activation context is a particular flag that is identified by a GUID. The activation context resides in the registry so that the extensible software application can obtain the state or value of the activation component.

Visual Studio utilizes the .NET Framework with includes a large class library, including a class library of regular expressions referred to as the .NET regular expressions. .NET regular expressions are written in a particular syntax or format that defines the particular pattern that is to be matched.

Although the following examples utilize a registry and .NET regular expressions, it should be noted that the subject matter described herein is not constrained to the use of a registry, a Windows-based operating system, Visual Studio, or .NET regular expressions. Syntaxes, other than .NET regular expressions, may be used such as without limitation, Boolean algebra. The subject matter described herein is not constrained in this manner.

FIG. 2A shows a first exemplary metadata file 202 having a single rule 206 that activates the activation context, "{622a8a4d-e1ad-4dff-bed9-944b510c8f6a}", whenever a file is selected that ends with the string ".config." The first line is used to identify the activation context 204 associated with the rule 206. The string "$RootKey$" identifies the root registry key for the extensible software application, the string "ContextRules" identifies this metadata block as metadata for the rules engine, and the string "{622a8a4d-e1ad-4dff-bed9-944b510c8f6a}" is a global unique identifier (GUID) for the activation context 204. The string "Expression" identifies the expression which has the single term, "DotConfig" 208. The string "HierSingleSelection-Name:\.config$" is a .NET regular expression. This regular expression defines a pattern that when matched evaluates the term to 'true' thereby causing the expression to be re-evaluated. This regular expression matches a selected file's name with the file extension ".config." The activation context identified by {622a8a4d-e1ad-4dff-bed9-944b510c8f6a} is then activated. When the activation context 204 is activated, it is set to a particular value and when the activation context 204 is deactivated is set to another value.

In this particular example, the activation context 204 is associated with a behavior that modifies the commands that are shown in the graphical user interface of the extensible software application. This can be accomplished by having the behavior, Command Visibility, tied to the activation context 204. When the activation context 204 is activated, then the Command Visibility behavior is applied which modifies the commands shown in the graphical user interface. Although not shown, additional lines may be included in the metadata file 202 to associate the activation context, {622a8a4d-e1ad-4dff-bed9-944b510c8f6a}, with the behavior Command Visibility. The behavior engine will read the metadata file at startup and associate the activation context with its corresponding behavior.

FIG. 2B depicts a second exemplary metadata file 210 that includes a rule that activates the activation context 212 when the user is not debugging and when either an XML or HTML file is being viewed in an editor. The first line of the metadata file 210 identifies the activation context 212. The string "$RootKey$" identifies the root registry key for the extensible software application, the string "ContextRules" identifies this metadata block as metadata for the rules engine, and the string "{E45C6862-F7ED-4F16-8736-3B001FAE5054}" is the GUID for the activation context 212.

The expression for this rule 214 is identified by the string "Expression" and includes three terms: "Debugging" 216; "XmlFile" 218; and "HtmlFile" 220. The term "Debugging" 216 evaluates to 'true' only when the debugger module that is part of the extensible software application is being used. The term "Debugging" 216 is associated with the string "{A6E5769D-6119-4CDD-A144-98C72A5E56D1}" which is the GUID representing a flag that identifies whether the debugger is activated or not. When the flag associated with the GUID is set, then the term "Debugging" 216 is set to 'true', otherwise, the flag is set to 'false."

The term "XmlFile" 218 evaluates to 'true' when the editor is viewing an XML file during execution of the extensible software application. The term "HtmlFile" 220 evaluates to 'true' when the editor is viewing an HTML file during execution of the extensible software application. In this example, the three terms that are used in the expression use three Boolean operators: the not operator (!); the AND operator (&); and the OR operator (|). In this example, parentheses are used to dictate an evaluation order. The expression evaluates to 'true' when the debugger is not in use and either an XML or HTML file is being viewed in the editor.

FIG. 2C depicts a third exemplary metadata file 230 that demonstrates a rule using a delay element. The delay element is used to postpone or defer activation or deactivation of the behavior by a defined amount of time. In this example, the delay is specified in milliseconds so the delay is a one second delay. In this example, the rule activates the activation context one second after the user of the extensible software application opens a solution and deactivates the activation context one second after the user closes the solution.

As shown in FIG. 2C, the first line of the metadata file 230 identifies the activation context 232. The string "$RootKey$" identifies the root registry key for the extensible application 232, the string "ContextRules" identifies this metadata block as metadata for the rules engine, and the string "{84418D17-5D9A-4BC8-B378-E54C1B80E6C2}" is the GUID for the activation context 232.

The rule 234 is identified by the string "Expression" and includes the term, "SolutionExists" 236 and the delay element 238. The term "SolutionExists" 236 evaluates to 'true' when the user of the extensible software application opens a solution. The string "Delay" 238 is used to define the duration of the delay which, in this case, is specified in milliseconds. The term "SolutionExists" 236 is associated with the string "{741B88D0-20D0-40F8-84D4-27E70425B390}" which is the GUID representing a flag that identifies whether or not the user of the extensible software application has opened a solution. When the flag associated with the GUID is set, then the term "SolutionExists" 236 changes from false to true. Conversely, when the flag associated with the GUID is cleared, then the term "SolutionExists" 236 changes from true to false. Either change causes a re-evaluation of the expression and subsequent activation or de-activation of the activation context. However, due to the delay element 238, the activation context is not set to 'true' until one second after the term "SolutionExists" is set to true and the activation context is not set back to 'false' until one second after the term "SolutionExists" changes back to "false."

The preceding examples illustrate how customizations may be applied to the extensible software application without loading or executing any of the program code associated with the extension. The rules are pre-defined expressions that activate existing operations provided within the extensible software application.

Attention now turns to a further description of an exemplary method. It may be appreciated that the representative method does not necessarily have to be executed in the order presented, or in any particular order, unless otherwise indicated. Moreover, various activities described with respect to the method can be executed in serial or parallel fashion, or any combination of serial and parallel operations. The method can be implemented using one or more hardware elements and/or software elements of the described embodiments or alternative embodiments as desired for a given set of design and performance constraints. For example, the method may be implemented as logic (e.g., computer program instructions) for execution by a logic device (e.g., a general-purpose or specific-purpose computer).

Figure 3:
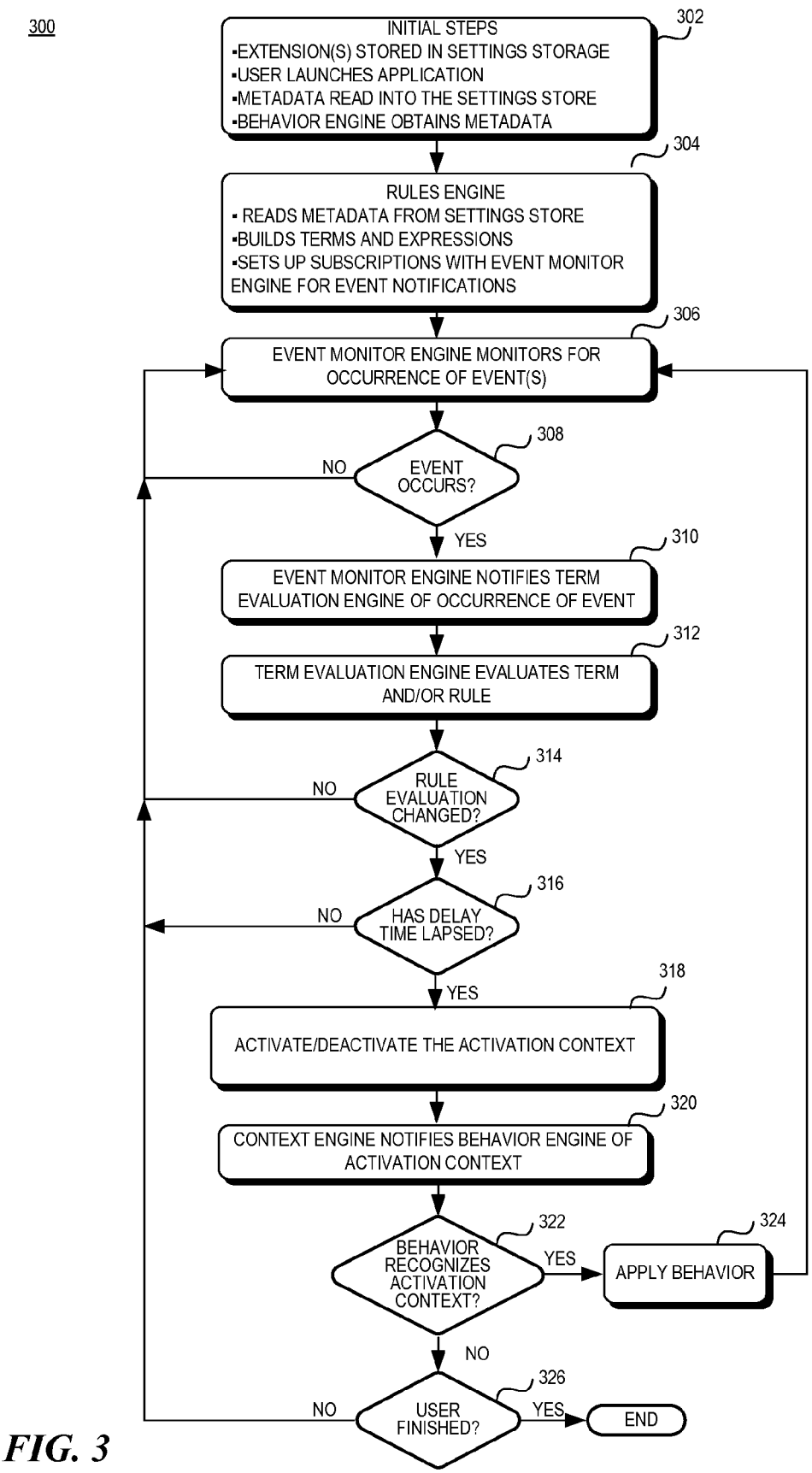
FIG. 3 is a flow diagram illustrating an exemplary method for initiating a behavior during execution of an extensible software application

FIG. 3 illustrates a flow diagram of an exemplary method for rule-based activation of behaviors in an extensible software application. It should be noted that the method 300 may be representative of some or all of the operations executed by one or more aspects described herein and that the method can include more or less operations than that which is described in FIG. 3.

Initially, the extension is stored in a settings storage that is associated with the system hosting the extensible software application (block 302). Once a user of the extensible software application launches the extensible software application (block 302), the metadata is read into a local store or memory used by the extensible software application (block 302). In addition, the behavior engine reads the metadata from the settings store to build the behavior table. The rules engine reads the metadata from the settings store, builds the terms and expressions from the metadata, and subscribes to the event monitor engine for notifications of the events associated with each term (block 304).

The event monitor engine monitors the operation of the extensible software application for the events associated with each term (blocks 306, 308—no). When an event occurs (block 308—yes), the event monitor engine notifies the term evaluation engine of the occurrence of the event (block 310). The term evaluation engine evaluates the term and if the term evaluates to 'true', the term evaluation engine evaluates the corresponding rule's expression (block 312). The previous result of evaluating the expression is stored so that, after re-evaluating the expression, if the result has not changed (block 314—no), then the process returns back to monitoring for the occurrence of an event (block 306).

When the result of evaluating the expression changes from the previously stored value and the delay time has lapsed (blocks 314—yes, 316—yes), then the term evaluation engine activates or deactivates the activation context via the activation context engine (block 318). The activation context engine notifies the behavior engine that the activation context has changed (block 320). The behavior engine searches for a behavior that is associated with the particular activation context (block 322). If there is a match of a behavior with the activation context (block 322—yes), then the behavior is applied (block 324). Otherwise, the process returns back to monitoring for the occurrence of events (block 322—no, block 326—no). The process continues until the user of the extensible software application is finished (block 326—yes).

Figure 4:
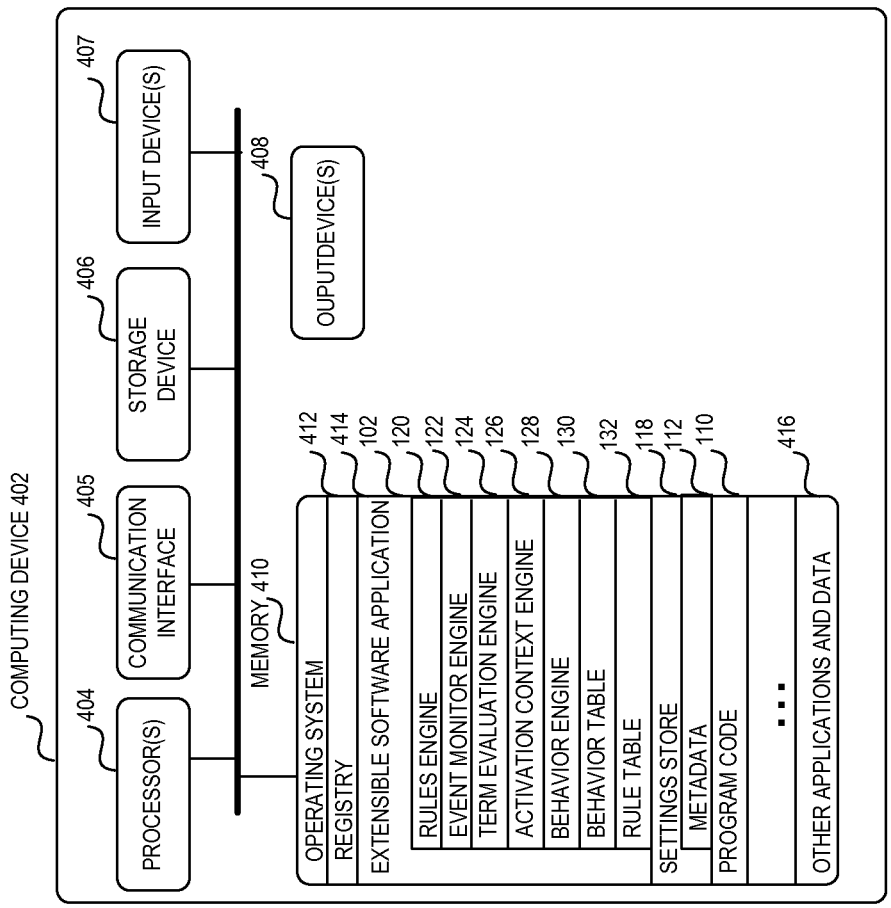
FIG. 4 is a block diagram illustrating a first exemplary operating environment.

Attention now turns to FIG. 4 and a discussion of a first exemplary operating environment. It should be noted that the operating environment 400 is exemplary and is not intended to suggest any limitation as to the functionality of the embodiments. The embodiment may be applied to an operating environment 400 utilizing a computing device 402. The computing device 402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 400 may include one or more processors 404, a communication interface 405, a storage device 406, one or more input devices 407, one or more output devices 408, and a memory 410. A processor 404 may be any commercially available processor and may include dual microprocessors and multi-processor architectures. The communication interface 405 facilitates wired or wireless communications between the computing device 402 and other devices. The storage device 406 may be computer-readable medium that does not contain propagating signals, such as modulated data signals transmitted through a carrier wave. Examples of the storage device 406 include without limitation RAM, ROM, EEPROM, flash memory or other memory technology, CD-ROM, digital versatile disks (DV), or other optical storage, magnetic cassettes, magnetic tape, magnetic disk storage, all of which do not contain propagating signals, such as modulated data signals transmitted through a carrier wave. The input devices 407 may include a keyboard, mouse, pen, voice input device, touch input device, etc., and any combination thereof. The output devices 408 may include a display, speakers, printers, etc., and any combination thereof.

The memory 410 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 410 may also include one or more external storage devices or remotely located storage devices that does not pertain to propagated signals, such as modulated data signals transmitted through a carrier wave. The memory 410 may contain instructions and data as follows:

an operating system 412;
a registry 414;
an extensible software application 102 that includes a rules engine 120, an event monitor engine 122, a term evaluation engine 124, an activation context engine 126, a behavior engine 128, a behavior table 130, and a rule table 132;
a setting store 118 including metadata 112;
a rules store 132;
program code 110; and
various other applications and data 416.

Figure 5:
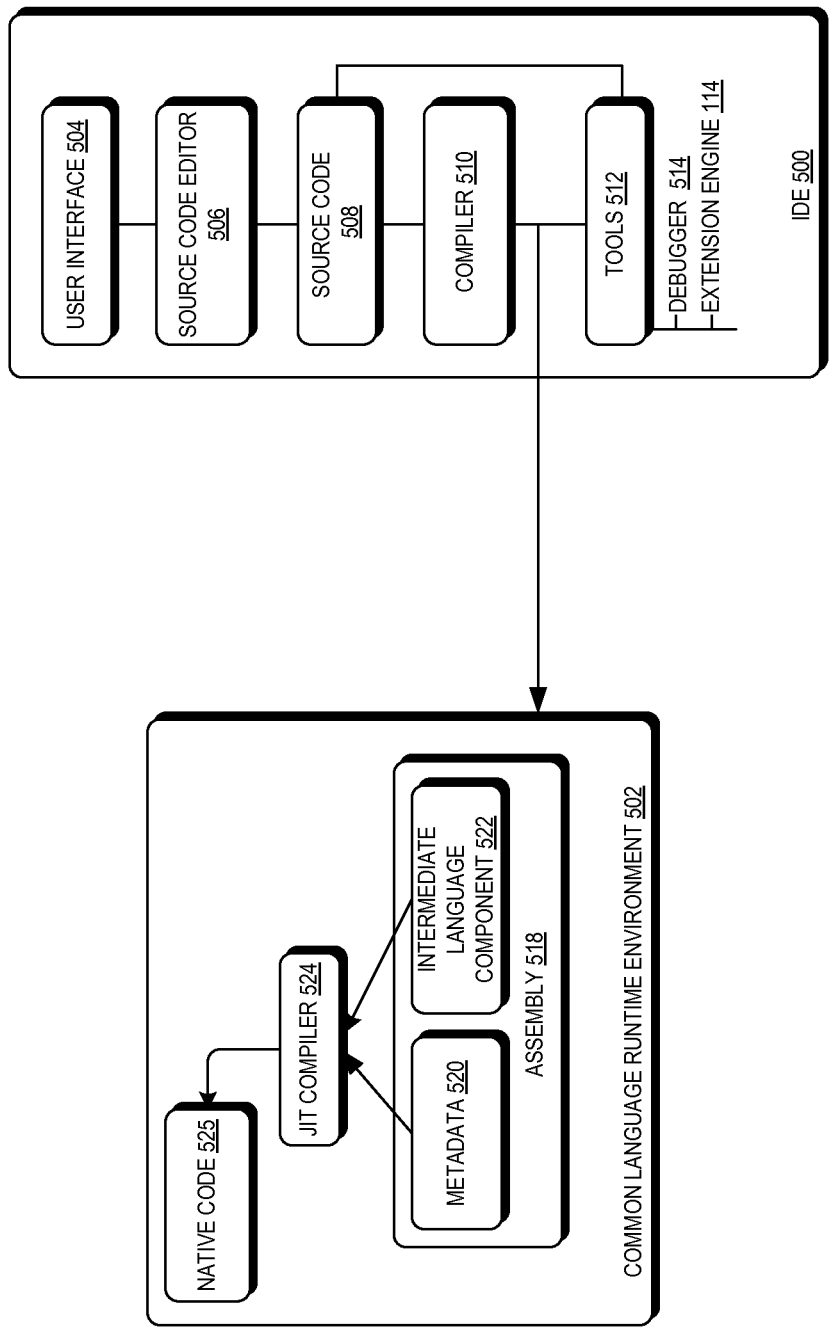
FIG. 5 is a block diagram illustrating a second exemplary operating environment.

FIG. 5 depicts a second exemplary operating environment where the extensible software application is embodied as an integrated development environment (IDE). The IDE 500 may allow a user (e.g., developer, programmer, designer, coder, etc.) to design, code, compile, test, run, edit, debug or build a program, set of programs, web sites, web applications, packages, and web services in a computing device. Software applications include source code (component 508), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 500 may provide a native code development environment or may provide a managed code development that runs on a virtual machine or may provide a combination thereof. The IDE 500 may provide a managed code development environment using the .NET framework. An intermediate language component 522 may be created from the source code 508 and the native code 525 using a language specific compiler 510 and the native code 525 (e.g., machine executable instructions) is created from the intermediate language (IL) component 522 using the just-in-time (JIT) compiler 524, when the application is executed. That is, when an intermediate language component 522 is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code 508 according to known software programming techniques and the specific logical and syntactical rules associated with a particular source language via a user interface 504 and a source code editor 506 in the IDE 500. The IDE 500 contains tools 512 that facilitate in the creation of the source code 508, such as a debugger 514 and the extension engine 114. Thereafter, the source code 508 can be compiled via a compiler 510, whereby an intermediate language representation of the program may be created, such as assembly 518. The assembly 518 may comprise the intermediate language component 522 and metadata 520.

The technology described herein activates or deactivates a behavior that is applied to an extensible software application in order to customize the extensible software application in a preferred manner. The technology uses rules to set the state of an activation context that triggers the application of a behavior. The activation context is not part of the extensible software application but is represented by a global identifier that is accessible by the extensible software application.

The use of the rules, which are stored in a separate file from the extension's program code, allows the extensible software application to determine when to activate or deactivate the behavior without executing the extension. In this manner, bottlenecks attributable to executing the extension in order to determine when to load and unload an extension are reduced.

Furthermore, the rules are based on expressions which rely on events to occur during execution of the extensible software application. The rules do not rely on the content of the extension. The expressions are formatted in a syntax that allows different combinations of events to trigger activation or deactivaton of a behavior at a finer granularity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method implemented on a computing device having at least one processor, the method comprising:
   obtaining at least one rule for setting a state of an activation context, the at least one rule including an expression having at least one operation applied to at least one term, the at least one term identifying at least one event to be monitored, a first state of the activation context used to signal that the at least one rule has been evaluated to activate a behavior when the expression evaluates to a first value, a second state of the activation context used to signal that the at least one rule has been evaluated to deactivate the behavior when the expression evaluates to a second value, the behavior associated with an operation to be applied to an extension to an extensible software application;
   executing the extensible software application;
   monitoring the at least one event for at least one of occurrence and non-occurrence of the at least one event;
   evaluating the expression;
   setting a state of the activation context based on the evaluation of the expression; and
   upon a change in the state of the activation context, performing one of activating and deactivating the behavior based on the changed state of the activation context.

2. The method of claim 1, further comprising:
   re-evaluating the at least one rule;
   detecting a change to a previous evaluation of the at least one rule;
   setting the activation context to the first state if the at least one rule evaluates to the first value and setting the activation context to the second state if the at least one rule evaluates to the second value.

3. The method of claim 1, wherein the at least one rule is obtained from a file separate from program code of the extension.

4. The method of claim 1, wherein the activation context is represented by a global identifier accessible by the extensible software application.

5. The method of claim 1, wherein the expression includes one or more terms, wherein a term is associated with an event.

6. The method of claim 1, wherein activation of the behavior loads the extension.

7. The method of claim 1, wherein activation of the behavior performs a customization to the extensible software application.

8. A computing device, comprising:
   at least one processor and a memory
   the at least one processor configured to:
   evaluate an expression to a first value, the expression associated with setting a state of an activation context associated with an extension to an extensible software application, the expression including at least one operation applied to at least one term, the at least one term associated with at least one monitored event;
   monitor the at least one monitored event during execution of the extensible software application for at least one of occurrence and non-occurrence of the at least one monitored event;
   evaluate the expression based on the monitoring;
   when the evaluation of the expression changes the first value, set a state of an activation context to deactivate a behavior associated with the activation context; and
   deactivate the behavior on the extensible software application.

9. The computing device of claim 8, wherein the at least one processor is further configured to:
   re-evaluate the expression upon detection of a change to the at least one monitored event; and
   set the activation context to a state that activates the behavior when the value of the expression changes.

10. The computing device of claim 8, wherein the at least one rule is obtained from a file separate from the extension.

11. The computing device of claim 8, wherein the activation context is represented by a global identifier accessible by the extensible software application.

12. The computing device of claim 8, wherein the extensible software application is an integrated development environment.

13. The computing device of claim 8, wherein activation of the behavior performs a customization to the extension.

14. A system comprising the following processor-executable components:
   a rules engine that generates at least one rule associated with an extension, the at least one rule including an expression that is evaluated based on application of one or more operations applied to one or more terms, wherein a term is based at least one of occurrence and non-occurrence of one or more monitored events during execution of an extensible software application;

an event monitor engine that monitors the one or more monitored events during execution of the extensible software application;

a term evaluation engine that evaluates the expression based on the one or more monitored events;

a context engine that sets a state of an activation context based on evaluation of the expression, a first state of the activation context used to signal that the at least one rule has been evaluated to activate a behavior, a second state of the activation context used to signal that the at least one rule has been evaluated to deactivate the behavior; and a behavior engine that applies the behavior to the extensible software application based on a state of the activation context.

15. The system of claim 14, wherein the at least one rule is represented as a Boolean expression having one or more terms, each term representing an event as a regular expression.

16. The system of claim 14, wherein the activation context is a flag managed by the extensible software application.

17. The system of claim 14, wherein the activation context is associated with a behavior that modifies a graphical user interface.

18. The system of claim 14, wherein the extensible software application is an integrated development environment.

19. The system of claim 14, wherein the activation context is represented as a globally accessible identifier.

20. The system of claim 14, wherein the behavior loads the extension.

* * * * *